United States Patent
Reinking et al.

(10) Patent No.: US 6,800,703 B1
(45) Date of Patent: Oct. 5, 2004

(54) METHOD FOR PREPARING PROPYLENE POLYMERS HAVING BROAD MOLECULAR WEIGHT DISTRIBUTION

(75) Inventors: Mark K. Reinking, Mason, OH (US); Douglas D. Klendworth, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/686,066

(22) Filed: Oct. 15, 2003

(51) Int. Cl.[7] ............................. C08F 4/64; C08F 4/649
(52) U.S. Cl. ................................. 526/125.3; 526/124.3; 526/124.9; 502/116; 502/118; 502/125
(58) Field of Search ........................... 526/124.3, 124.9, 526/125.3; 502/116, 118, 125

(56) References Cited

U.S. PATENT DOCUMENTS

| | | | | |
|---|---|---|---|---|
| 4,816,433 A | | 3/1989 | Terano et al. | 502/127 |
| 4,829,037 A | | 5/1989 | Terano et al. | 502/112 |
| 4,970,186 A | | 11/1990 | Terano et al. | 502/125 |
| 5,494,872 A | * | 2/1996 | Hosaka et al. | 502/115 |
| 5,547,912 A | | 8/1996 | Kataoka et al. | 502/154 |
| 5,844,046 A | * | 12/1998 | Ohgizawa et al. | 525/270 |

* cited by examiner

*Primary Examiner*—Roberto Rabago
(74) *Attorney, Agent, or Firm*—Shao-Hua Guo

(57) ABSTRACT

A method for producing propylene polymers having a broad molecular weight distribution (MWD) is disclosed. The method uses a Ziegler catalyst and one silane donor. The silane donor is selected from vinyltrimethoxysilane or dicyclohexyldimethoxysilane. The polymers made by the method have an MWD greater than or equal to 7.0.

10 Claims, No Drawings

METHOD FOR PREPARING PROPYLENE POLYMERS HAVING BROAD MOLECULAR WEIGHT DISTRIBUTION

FIELD OF THE INVENTION

The invention relates to propylene polymers. More particularly, the invention relates to a method for preparing propylene polymers which have increased molecular weight distribution.

BACKGROUND OF THE INVENTION

Variables that have primary effect on the processing and physical properties of propylene polymers include molecular weight (normally expressed in terms of melt flow rates), molecular weight distribution (MWD), and stereospecificity. The weight average molecular weight (Mw) of propylene polymers ranges usually from about 200,000 to about 600,000. Molecular weight distribution is expressed as the ratio of Mw/Mn; Mn is the number average molecular weight. The ratio of Mw/Mn is also known as the polydispersity index (PDI).

The MWD has a significant effect on the processability and end-use properties of propylene polymers. Molten polymers are shear-sensitive, i.e., the apparent viscosity of molten polymers decreases as the applied pressure increases. Propylene polymers that have broad MWD are more shear-sensitive than those that have narrow MWD. As a result, broad MWD propylene polymers flow more readily in injection molding processes than narrow MWD propylene polymers.

The MWD of propylene polymers is a function of both the catalyst system and the polymerization process. Polymers produced with high-activity catalysts usually have narrow MWD. Therefore, propylene polymers produced with high-activity catalysts often need broadening their MWD. Post-treatments of polymers can increase MWD. However, post-treatments are often costly. More cost-effective methods involve modifying the polymerization process and catalyst systems so that the produced polymers have broadened MWD during polymerization.

For instance, U.S. Pat. No. 5,844,046 teaches the use of external donors such as silane compounds in the polymerization to broaden the MWD. However, this reference patent expressly teaches the use of a combination of at least two donors. According to this referenced patent, if only one silane compound is used, the produced polymers have relatively narrow MWD. The need for a combination of at least two donors complicates the polymerization process. Therefore, new methods for broadening the MWD of propylene polymers are needed. Ideally, the method would use high-activity Ziegler catalysts but use only one silane donor in the polymerization process.

SUMMARY OF THE INVENTION

The invention is a method for producing propylene polymers which have broad molecular weight distribution (MWD). The method comprises polymerizing propylene and an optional α-olefin comonomer or an optional elastomer in the presence of a Ziegler catalyst and one silane donor. The silane donor is selected from vinyltrimethoxysilane or dicyclohexyldimethoxysilane. The resulting polymer has MWD greater than or equal to 7.0.

Contrary to the general belief in the art that a combination of two or more electron donors is usually needed (see, e.g., U.S. Pat. No. 5,844,046), we found that the use of one donor selected from vinyltrimethoxysilane or dicyclohexyldimethoxysilane is more effective in increasing the MWD of the polymers. For instance, when either vinyltrimethoxysilane or dicyclohexyldimeth oxysilane is used, the polymers produced have MWD greater than or equal to 7.0. We found that some other silanes, e.g., cyclohexylmethyldimethoxysilane, when used alone, are not effective to produce propylene polymers of broad MWD. We also found that although vinyltrimethoxysilane alone gives polymers of broad MWD, its combination with a second silane, e.g., cyclohexylmethyldi-methoxysilane, cannot produce broad MWD polymers.

DETAILED DESCRIPTION OF THE INVENTION

The invention is a method for making propylene polymers. The polymers made by the method include propylene homopolymers, impact copolymers and random copolymers. The homopolymers include isotactic, syndiotactic, and atactic polypropylene.

The impact copolymers are made by polymerizing propylene in the presence of an elastomer. Alternatively, the impact copolymers are made by a two-reactor process. In a first reactor, a propylene homopolymer is made, and in a second reactor an elastomer is made. The homopolymer and the elastomer are then blended. Preferred elastomer is ethylene/propylene rubber. The ethylene/propylene rubber is preferably at levels of 5 to 25 wt % of the impact copolymers.

The random copolymers are made by copolymerizing propylene with an α-olefin comonomer. Preferred α-olefin comonomer is ethylene. Preferably, the random copolymer contains about 1 to about 7 wt % of ethylene units and about 93 to about 99 wt % of propylene units.

The polymers made by the method have a molecular weight distribution (MWD) greater than or equal to 7.0. Preferably, the MWD is greater than or equal to 8.0. The MWD is defined as $$MWD=Mw/Mn$$

Mw is a weight average molecular weight, and Mn is a number average molecular weight. The MWD is measured by, e.g., gel permeation chromatograph (GPC) method. A detailed GPC method is disclosed in the Examples.

Suitable Ziegler catalysts for use in the method of the invention include those which are known to the polyolefin industry. Preferred catalyst comprises a titanium compound. Preferably, the titanium compounds are selected from the group consisting of titanium tetrahalides, alkoxytitanium trihalides, dialkoxytitanium dihalides, trialkoxytitanium monohalides, tetraalkoxytitaniums, and mixtures thereof. Examples of titanium compounds are $TiCl_4$, $TiBr_4$, $TiI_4$, $Ti(OCH_3)Cl_3$, $Ti(OC_2H_5)Cl_3$, $Ti(O\text{-}n\text{-}C_4H_9)Cl_3$, $Ti(OC_2H_5)Br_3$, $Ti(O\text{-}iso\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$, and $Ti(O\text{-}n\text{-}C_4H_9)_4$, the like, and mixtures thereof. Titanium halides, particularly titanium tetrahalides, are preferred. Titanium tetrachloride is more preferred.

Suitable Ziegler catalyst can further comprise a magnesium compound. Suitable magnesium compounds are preferably selected from the group consisting of dialkylmagnesiums, alkylmagnesium halides, alkylalkoxymagnesiums, dialkoxymagnesium, the like, and mixtures thereof. Examples are dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, and ethylbutylmagnesium. Dialkoxymagnesiums are preferred.

Suitable Ziegler catalyst can also comprise a phthalic diester. The two ester groups of the phthalic esters can be the same. Examples are dimethyl phthalate, diethyl phthalate, dipropyl phthalate, diisopropyl phthalate, dibutyl phthalate, diisobutyl phthalate, diamyl phthalate, diisoamyl phthalate, dihexyl phthalate, dioctyl phthalate, di-isooctyl phthalate, didecyl phthalate, didodecyl phthalate, and dihexadecyl phthalate, the like, and mixtures thereof. The two ester groups can also be different. Examples are methyl ethyl phthalate, methyl propyl phthalate, methyl butyl phthalate, methyl isobutyl phthalate, ethyl propyl phthalate, ethyl butyl phthalate, ethyl isobutyl phthalate, propyl butyl phthalate, propyl isobutyl phthalate, propyl amyl phthalate, butyl amyl phthalate, ethyl hexyl phthalate, butyl hexyl phthalate, methyl octyl phthalate, ethyl octyl phthalate, propyl decyl phthalate, octyl dodecyl phthalate, and ethyl hexadecyl phthalate, the like, and mixtures thereof.

Methods for preparing Ziegler catalysts are well known. For example, U.S. Pat. Nos. 4,816,433, 4,829,037, 4,970,186, 5,547,912, and 5,494,872, the teachings of which are incorporated herein by reference, teach a variety of ways to make Ziegler catalysts. In one method, a magnesium compound is suspended in an organic solvent and then reacted with a titanium compound at an elevated temperature. A phthalic diester is then added to the suspension at room temperature to yield a catalyst.

The catalyst is preferably used in an amount of 0.001 to 10 g per kg of polymer produced. More preferably, the catalyst is used in an amount of 0.01 to 1 g per kg of polymer produced.

The Ziegler catalyst is used with a co-catalyst. Suitable co-catalysts include organoaluminum compounds. Preferred co-catalysts are trialkyl aluminum. Examples are trimethylaluminum, triethylaluminum, and triisobutylaluminum. The co-catalyst is preferably used in a molar ratio of Al/Ti of 1.0–1000.

The polymerization can be performed in a vapor-phase, slurry or bulk process. Preferably, the polymers are prepared in a vapor-phase process or a slurry process. In a bulk process, the residual monomers tend to stay in the polymer and cause handling problems. Although washing with organic solvents can remove a large part of these residues, this increases the overall cost of the production. Preferred solvents for the slurry process include $C_{4-10}$ hydrocarbons. Examples are butane, hexane, and heptane.

The polymerization is performed in the presence of one silane donor. The silane donor is either vinyltrimethoxysilane or dicyclohexyldimethoxysilane. We found that the use of a single donor, either vinyltrimethoxysilane or dicyclohexyldimethoxysilane, is more effective in producing broad MWD polymers. For instance, when either vinyltrimethoxysilane or dicyclohexyldimethoxysilane is used, the polymers produced have MWD greater than 8.0 (see Examples 1–3). We found that some other silanes, e.g., cyclohexylmethyldimethoxysilane, when used alone, are not effective to give polymers that have broad MWD (see Comparative Examples 4–6.) We also found that, although vinyltrimethoxysilane alone gives polymers of broad MWD, its combination with a second silane, e.g., cyclohexylmethyldimethoxysilane, fails to produce broad MWD polymers (see Comparative Example 7).

The polymerization is preferably performed at a temperature within the range of 50° C. to 150° C. More preferably, the temperature is within the range of 50° C. to 100° C. The reactor pressure is preferably within the range of atmospheric pressure to 5,000 psi. More preferably, the reactor pressure is within the range of 50 to 500 psi.

The following examples merely illustrate the invention. Those skilled in the art will recognize many variations that are within the spirit of the invention and scope of the claims.

Catalyst Preparation

Ziegler catalyst is prepared according to U.S. Pat. No. 4,816,433. A reactor equipped with a stirrer is purged with nitrogen. The reactor is charged with 10 g of diethoxymagnesium and 80 mL of toluene. The reactor contents are stirred to form a suspension. To the suspension is added 20 mL of $TiCl_4$. The mixture is heated to 90° C. and is then added with 2.7 mL of di-n-butyl phthalate. The mixture is then heated to 115° C. and maintains at this temperature reading for two hours with stirring. After completion of the reaction, the reaction mixture is washed two times each with 100 mL of toluene. To the solid thus obtained is added 20 mL of fresh $TiCl_4$ and 80 mL of toluene, and the mixture is reacted for two hours with stirring at 115° C. After completion of the reaction, the reaction mixture is washed ten times each with 200 mL of n-heptane at 40° C. The content of titanium in the solid catalyst obtained is about 2.61% by weight. The catalyst (0.9 g) is mixed with 1.8 g of dry particulate $MgCl_2$.

Polymerization

A one gallon reactor is purged with dry nitrogen at 115° C. for at least one-half hour to remove water or moisture. Hydrogen is added as a 100 psi pressure drop from a 300 mL vessel. Propylene (1000 mL) is added to the reactor and the temperature is controlled at about 70° C. Triethylaluminum (2.90 mL, 1.56 mol/L in heptane) is added into the reactor with a flush of 150 mL of liquid propylene. A silane donor specified in Table 1 (3.00 mL, 0.200 mol/L solution) is added with a flush of 150 mL of liquid propylene. The above prepared catalyst/$MgCl_2$ mixture (0.030 g) is mixed with 0.10 mL of triethylaluminum for approximately 15 minutes and the resulting mixture is flushed into the reactor with 200 mL of liquid propylene. A total of 1500 mL of liquid propylene is used in the reactor. After one hour of polymerization, the reactor is vented and cooled to room temperature. The polymer is dried in a fume hood.

GPC Method

The weight average molecular weight (Mw), number average molecular weight (Mn), and molecular weight distribution (Mw/Mn) of polymers are obtained by gel permeation chromatography (GPC) on a Waters GPC2000CV high temperature instrument equipped with a mixed bed GPC column (Polymer Labs mixed B-LS) and 1,2,4,4-trichlorobenzene (TCB) as the mobile phase. The mobile phase is used at a nominal flow rate of 1.0 mL/min and a temperature of 145° C. No antioxidant is added to the mobile phase, but 800 ppm BHT is added to the solvent used for sample dissolution. Polymer samples are heated at 175° C. for two hours with gentle agitation every 30 minutes. Injection volume is 100 microliters.

Molecular weights are calculated using the cumulative matching % calibration procedure employed by the Waters Millenium 4.0 software. This involves first generating a calibration curve using narrow polystyrene standards (PSS, products of Waters Corporation), then developing a polypropylene calibration by the Universal Calibration procedure.

EXAMPLES 1–2

The above polymerization procedure is followed. One silane donor, dicyclohexyldimethoxysilane, is used. The same procedure is repeated twice.

The resulting polymers have MWD: 8.30 and 8.12, respectively.

EXAMPLE 3

The above polymerization procedure is followed. One silane donor, vinyltrimethoxysilane, is used. The resulting polymer has MWD: 8.05.

COMPARATIVE EXAMPLES 4–6

The above polymerization procedure is followed. One silane donor, cyclohexylmethyldimethoxysilane, is used. The same procedure is repeated three times. The resulting polymers have MWD: 6.66, 6.68, and 6.90, respectively.

COMPARATIVE EXAMPLE 7

The above polymerization procedure is followed. A mixture of donors, 50/50 mixture of vinyltrimethoxysilane and cyclohexylmethyldimethoxysilane, is used. The resulting polymer has MWD: 6.76.

TABLE I

EFFECT OF SILANE DONOR ON MWD OF POLYPROPYLENE

| Example No. | Silane Donor | MWD |
|---|---|---|
| 1 | Dicyclohexyldimethoxysilane | 8.30 |
| 2 | Dicyclohexyldimethoxysilane | 8.12 |
| 3 | Vinyltrimethoxysilane | 8.05 |
| C4 | Cyclohexylmethyldimethoxysilane | 6.66 |
| C5 | Cyclohexylmethyldimethoxysilane | 6.68 |
| C6 | Cyclohexylmethyldimethoxysilane | 6.90 |
| C7 | 50/50 mixture of vinyltrimethoxysilane and cyclohexylmethyldimethoxysilane | 6.76 |

We claim:

1. A method which comprises polymerizing propylene, optionally in the presence of an olefin comonomer or an elastomer, with a Ziegler catalyst and one silane donor selected from vinyltrimethoxysilane or dicyclohexyldimethoxysilane, said method producing a propylene polymer having a molecular weight distribution greater than or equal to 8.0.

2. The method of claim 1 wherein the silane donor is vinyltrimethoxysilane.

3. The method of claim 1 wherein the silane donor is dicyclohexyldimethoxysilane.

4. The method of claim 1 wherein the Ziegler catalyst comprises a titanium compound selected from the group consisting of titanium tetrahalides, alkoxytitanium trihalides, dialkoxytitanium dihalides, trialkoxytitanium monohalides, tetraalkoxytitaniums, and mixtures thereof.

5. The method of claim 4 wherein the titanium compound is titanium tetrachloride.

6. The method of claim 4 wherein the Ziegler catalyst further comprises a magnesium compound selected from the group consisting of dialkylmagnesiums, alkylmagnesium halides, alkylalkoxymagnesiums, dialkoxymagnesium, and mixtures thereof.

7. The method of claim 6 wherein the magnesium compound is dialkoxymagnesium.

8. The method of claim 7 wherein the dialkoxymagnesium is diethoxymagnesium.

9. The method of claim 4 wherein the Ziegler catalyst further comprises a phthalic diester.

10. The method of claim 9 wherein the phthalic diester is dibutylphthalate.

* * * * *